(12) United States Patent
Walley

(10) Patent No.: US 6,360,085 B1
(45) Date of Patent: Mar. 19, 2002

(54) SYSTEM AND METHOD FOR RECEIVING A SIGNAL

(75) Inventor: Kenneth S. Walley, Portola Hills, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,484

(22) Filed: Sep. 30, 1999

(51) Int. Cl.[7] .............................. H04B 17/00; H04B 1/16
(52) U.S. Cl. .................... 455/226.2; 455/296; 455/343
(58) Field of Search .......................... 455/343, 574, 455/234.1, 296, 63, 226.1, 226.2; 340/825.44

(56) References Cited

U.S. PATENT DOCUMENTS 5,241,691 A  * 8/1993 Owen ..................... 455/343
5,448,756 A  * 9/1995 DeLuca et al. ........... 455/343

* cited by examiner

*Primary Examiner*—Nguyen T. Vo
(74) *Attorney, Agent, or Firm*—Christopher J. Rourk; Akin Gump Strauss Hauer & Feld & LLP

(57) ABSTRACT

A system for receiving a signal is provided. The system includes a receiver that is operable to receive the signal, but which may also receive a noise signal. A duty cycle system is connected to the receiver. The duty cycle system can turn the receiver off and on at a controllable frequency. A signal strength system is also connected to the receiver, and is further connected to the duty cycle system. The signal strength system can determine the signal strength of the signal received by the receiver. If the signal strength indicates that the noise signal is not being received, the signal strength system generates control commands to the duty cycle system that cause the duty cycle system to cycle various components of the receiver that are used to suppress noise on and off, so as to conserve power.

20 Claims, 4 Drawing Sheets

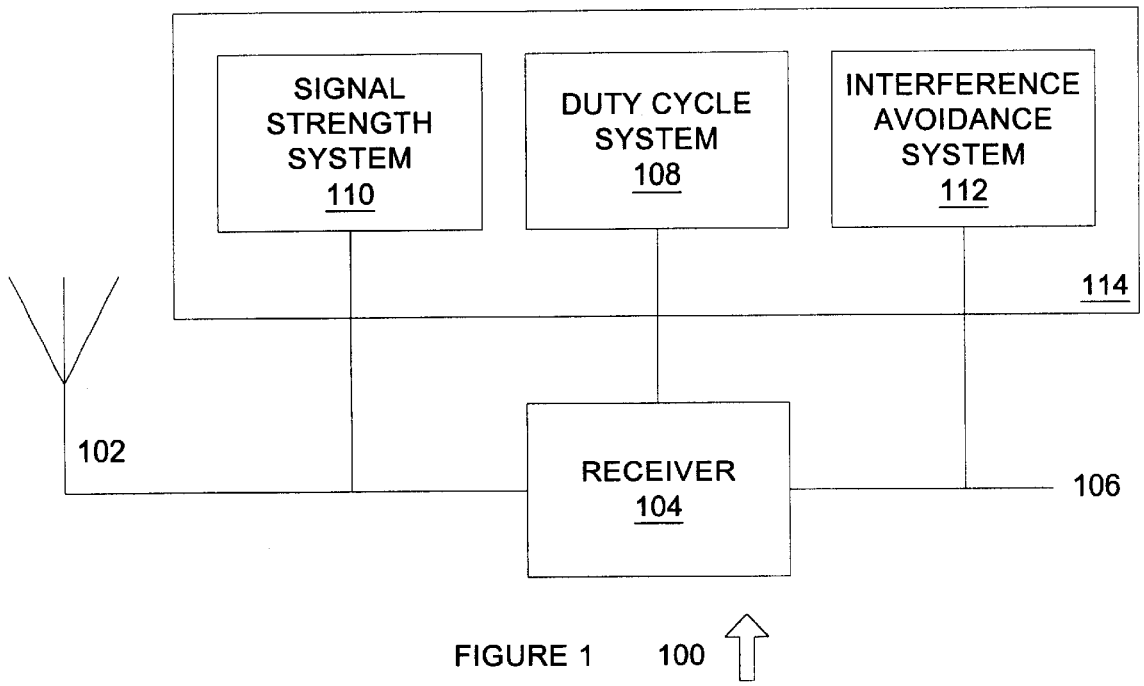
FIGURE 1    100
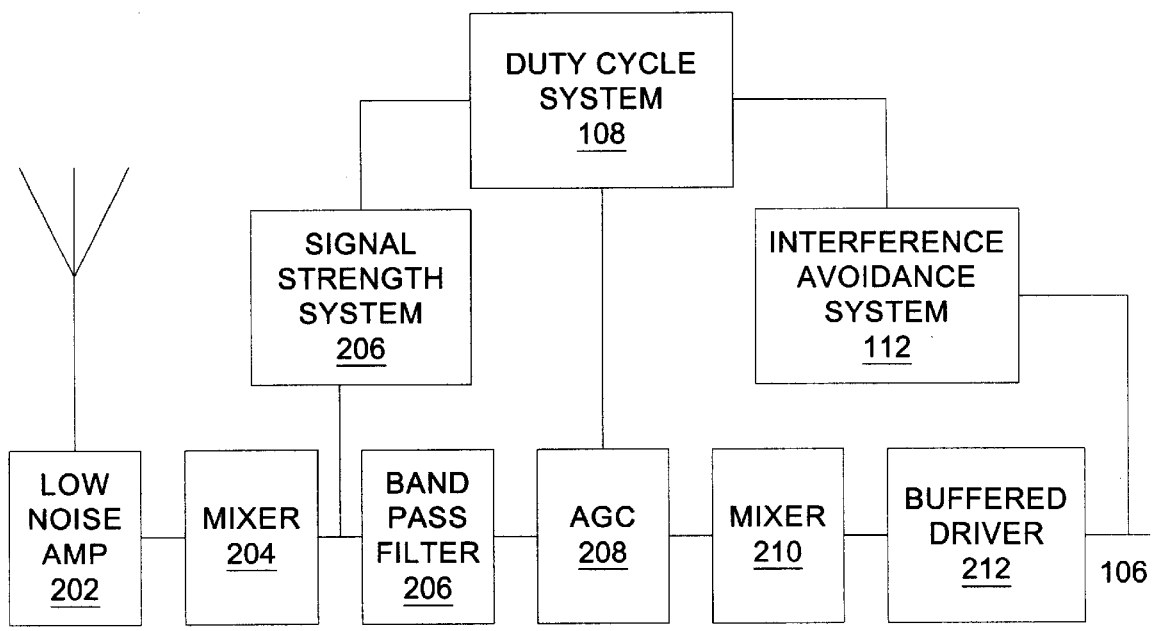
FIGURE 2    200

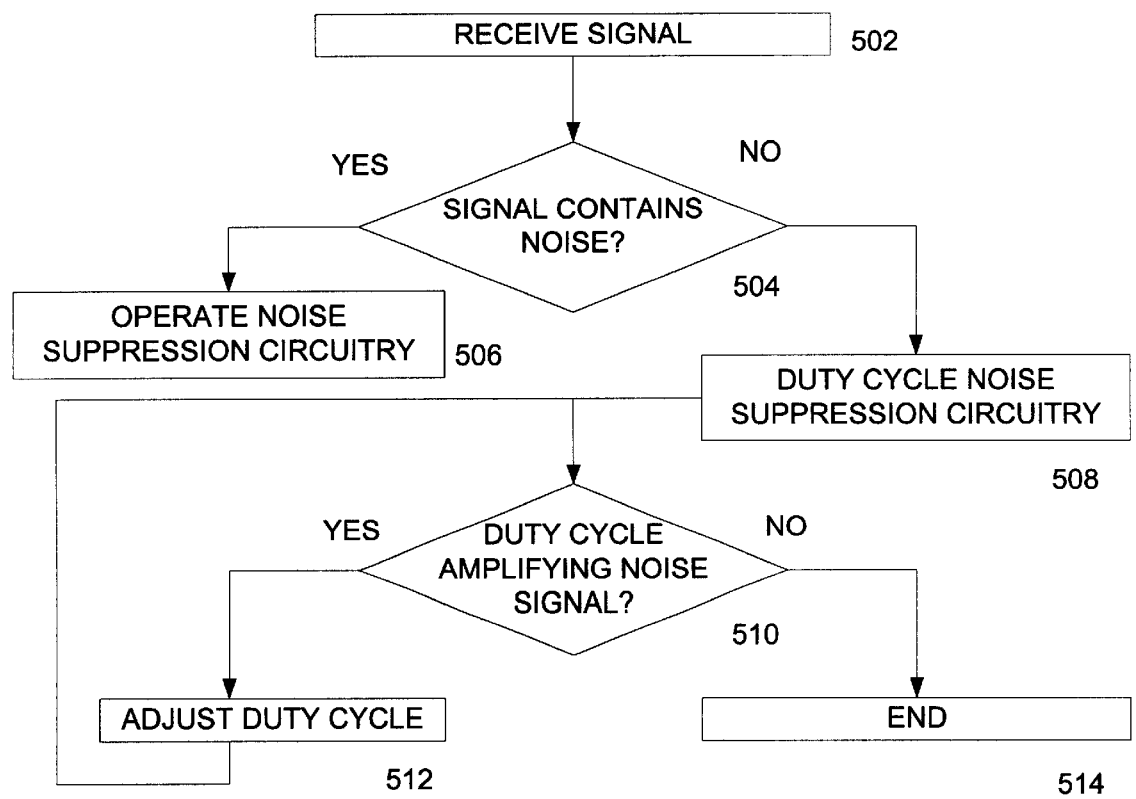
FIGURE 5    500    

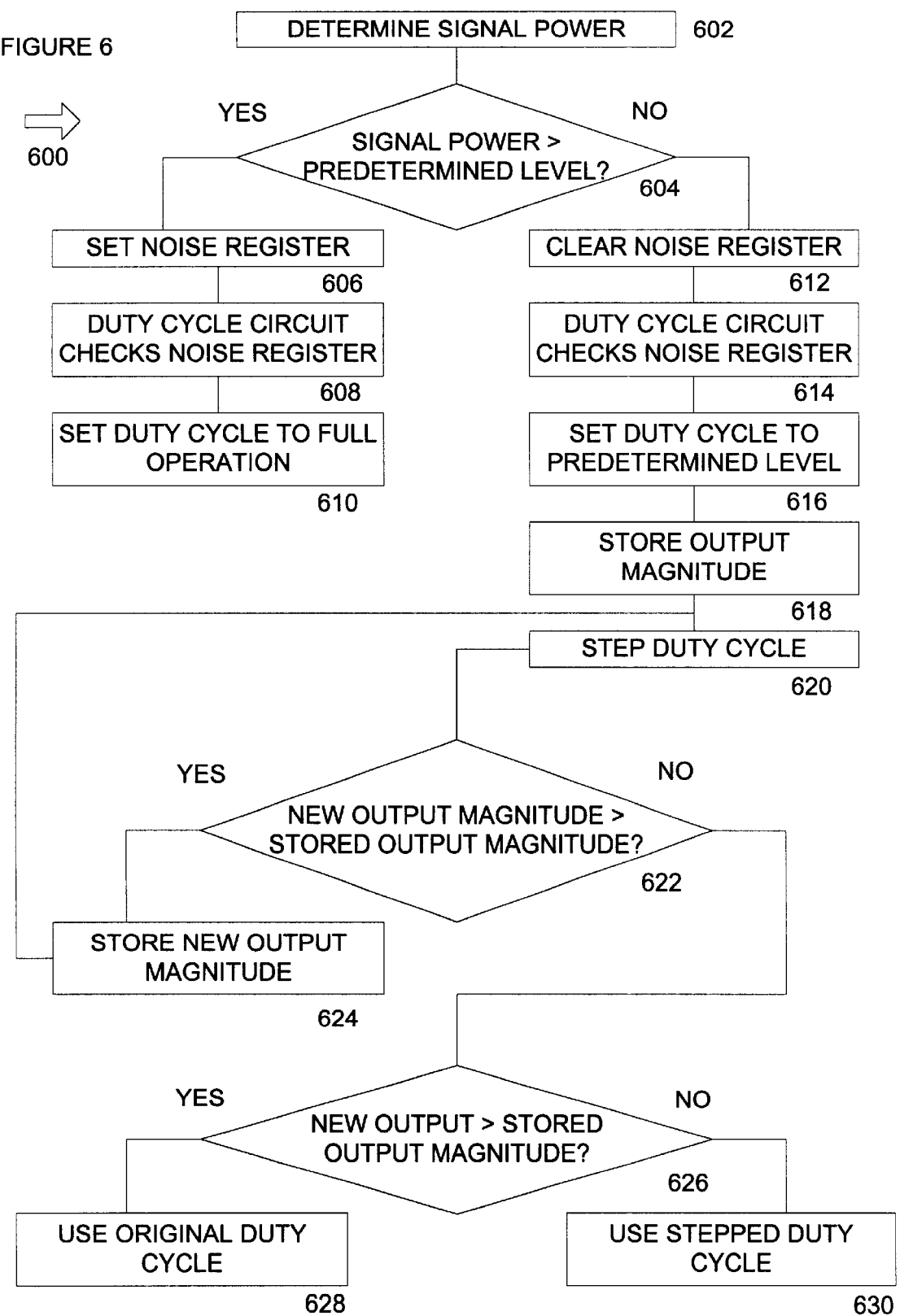

SYSTEM AND METHOD FOR RECEIVING A SIGNAL

FIELD OF THE INVENTION

The present invention relates to radio signal receivers and more specifically to a system and method for using adaptive linearity and power modulation such that power consumption is reduced when not needed such as in the absence of excess signal interference.

BACKGROUND OF THE INVENTION

Modern receiver systems have developed along widely accepted designs that result from a trade-off between various design requirements. For example, the components and systems of a wireless or cordless communications device must typically be selected by balancing requirements for cost, size, weight, signal reception and transmission, and power consumption, each of which may be equally important depending upon the application. For some stationary communications devices, the size, weight, and power consumption may be less important than the signal reception and transmission features. Thus, the stationary device might be heavier and consume more power than a wireless device, but may also be able to transmit a stronger signal and to receive a weaker signal.

For wireless or cordless devices, many systems and components, such as mixers and automatic gain controllers, have been accepted as standard receiver stages so as to provide a known level of noise reduction capability in exchange for a higher-than-optimal rate of power consumption. Thus, while it may be desirable to eliminate one or more of these systems or components to increase the length of time that the device may operate using a battery, eliminating the components or systems might result in an unacceptable level of noise, such as interference or atmospheric noise, in certain applications. Thus, the only alternative available to increase the length of time that the wireless or cordless device may be used is to increase the battery size, which also results in increased weight and cost.

SUMMARY OF THE INVENTION

Therefore, a system and method for receiving a signal are required that allow the power requirements for receiving the signal to be decreased without eliminating systems and components for noise reduction that are normally required throughout the industry.

The present invention provides a system and method for receiving a signal that decreases the receiver power requirements when the receiver is not receiving a signal that includes noise, but which allows the receiver to use standard noise reduction systems and components when noise is present.

On aspect of the present invention is a system for receiving a signal. The system includes a receiver that is operable to receive the signal, but which may also receive a noise signal. A duty cycle system is connected to the receiver. The duty cycle system can turn the receiver off and on at a controllable frequency. A signal strength system is also connected to the receiver, and is further connected to the duty cycle system. The signal strength system can determine the signal strength of the signal received by the receiver. If the signal strength indicates that the noise signal is not being received, the signal strength system generates control commands to the duty cycle system that cause the duty cycle system to cycle various components of the receiver on and off that are used to suppress noise, so as to conserve power.

The present invention provides many important technical advantages. One important technical advantage of the present invention is a system and method for decreasing the power requirements of a receiver that does not require standard receiver stages to be omitted from the receiver. The present invention allows these stages to operate fully when needed to suppress noise, but decreases the power used by these stages when appreciable levels of noise, such as interference, are not present in the received signal.

BRIEF DESCRIPTION OF THE DRAWINGS

FIG. 1 is a diagram of a system for receiving a signal in accordance with an exemplary embodiment of the present invention;

FIG. 2 is a diagram of a system for receiving a signal in accordance with another exemplary embodiment of the present invention;

FIG. 5 is a flowchart of a method for suppressing noise in accordance with an exemplary embodiment of the present invention; and FIG. 6 is a flowchart of a method for receiving a signal in accordance with an exemplary embodiment of the present invention.

DETAILED DESCRIPTION OF PREFERRED EMBODIMENTS

Figure 3:
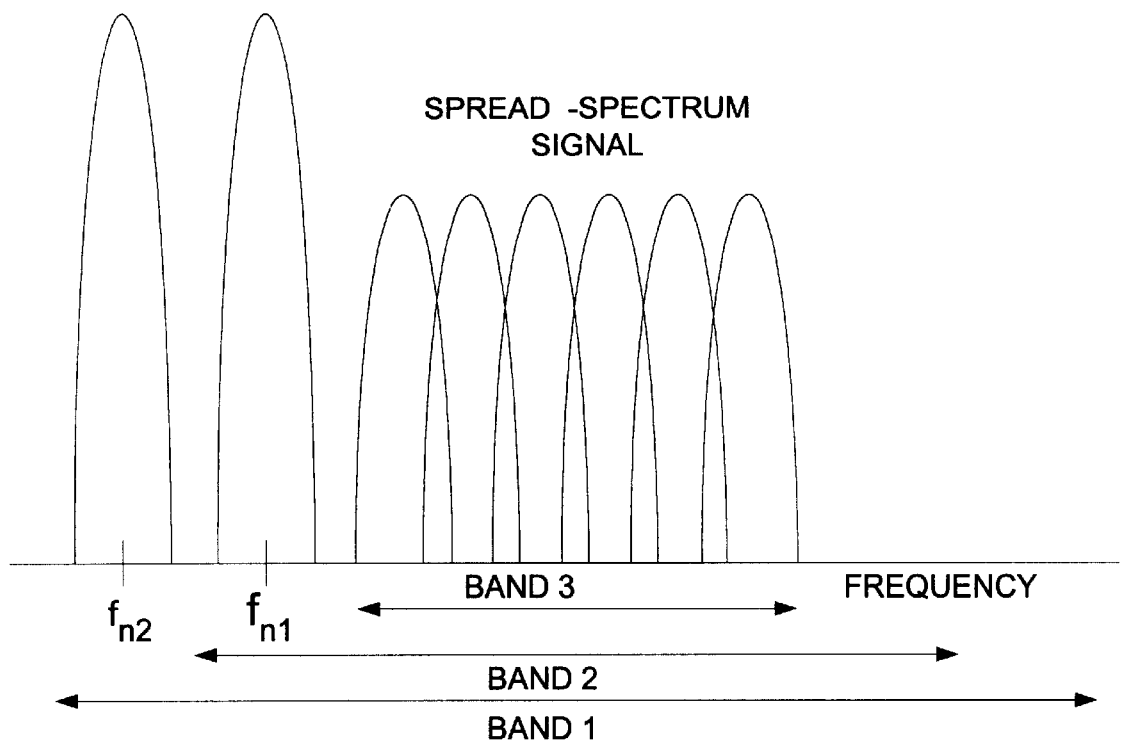
FIG. 3 is a frequency diagram showing base band and noise frequencies that may be received by a receiver in accordance with an exemplary embodiment of the present invention.

In the description which follows, like parts are marked throughout the specification and drawing with the same reference numerals, respectively. The drawing figures may not be to scale and certain components may be shown in generalized or schematic form and identified by commercial designations in the interest of clarity and conciseness.

FIG. 1 is a diagram of a system 100 for receiving a signal in accordance with an exemplary embodiment of the present invention. System 100 may be used to duty cycle systems and components of a radio receiver that are used to reduce noise, such that the power consumption requirements of the receiver are minimized when noise signals are not present in the received signal.

System 100 includes antenna 102 which is coupled to receiver 104. As used in this application, the term couple and its cognate terms, such as coupling and coupled, may refer to a physical connection (such as a copper conductor or data bus), a logical connection (such as through logical devices of a semiconducting component), a virtual connection (such as through randomly assigned memory locations of a memory device), a combination of such connections, or other suitable connections. For example, the term couple may denote a connection through intervening components. Antenna 102 is a standard radio antenna, such as a monopole antenna, a dipole antenna, a patch antenna, or other suitable radio antennas. Receiver 104 is a radio receiver that is operable to receive radio frequency signals from antenna 102 and to convert the radio frequency signals into an electrical signal for subsequent processing for communications or other functions.

System 100, also includes output 106. Output 106 delivers the processed signal from receiver 104 to a cellular telephone application-specific integrated circuit, an analog to digital converter, a speaker, or other suitable systems or components.

System 100 also includes a control system such as duty cycle system 108. Duty cycle system 108 may be implemented in hardware, software, or a suitable combination of hardware and software, and may be an application-specific integrated circuit or field programmable gate array. Duty cycle system 108 is operable to cycle components and systems of receiver 104 off and on according to control data received from signal strength system 110. Duty cycle system 108 may cycle the power source to systems or components of receiver 104 off and on at a predetermined frequency and for a predetermined period of time so as to decrease the power requirements of the systems and components without entirely disabling such systems and components.

For example, it may be known or empirically determined that a mixer or automatic gain control system may be cycled off and on at a predetermined frequency and for a predetermined period of time such that the response of the mixer or automatic gain control system is proportionately decreased but is not completely interrupted. In this manner, the power consumed by the mixer or automatic gain control system may be decreased without completely removing the effectiveness of the components from the receiver circuitry. Duty cycle system 108 is operable to cycle these components off and on according to control commands received from signal strength system 110 and other suitable control systems such that the components of receiver 104 may be cycled off and on in a predetermined manner when noise is determined to be absent from the received circuit. These systems and components of receiver 104 are typically included in receiver 104 to minimize the effects of noise that may be present in the received signal. When such noise is not present in the received signal, then these components and systems of receiver 104 do not need to be operating to peak noise reduction capability.

Duty cycle system 108 is also operable to detect signal levels within the system as well as other measures indicating the presence and strength of distortion such as demodulation signal quality. Duty cycle system 108 can then adjust the linearity and power modulation of predetermined receiver blocks. Duty cycle system 108 reduces the power consumption of the system 100 by applying to controlled linearity adjusted stages the needed linearity for the system, and by applying to controlled power modulated stages the needed inputs for meeting overall receiver performance for the given input receiver signals and interference.

For example, in the presence of a strong interfering signal, the linearity of the receiver stages needs to be increased and the power modulation effect reduced. When the interfering signal is weak, less linearity is needed and more power modulation may be applied. The detection of noise, such as interference, may be accomplished by signal strength sensors, receiver signal quality detectors, or other suitable components or systems. Power modulation may be applied at different rates to dynamically avoid interference, such as to prevent spurious responses from interference, jamming signals, noise, or other signals. For example, the power modulation may be random.

Signal strength, system 110 is coupled to duty cycle system 108, receiver 104, and antenna 102, but may alternatively be coupled to intermediate stages of receiver 104 to receive a predetermined signal. Signal strength system 110 may be implemented in hardware or a suitable combination of hardware and software, and may include an application-specific integrated circuit or field programmable gate array that is used in conjunction with a signal strength system that is operable to determine signal strength based upon predetermined criteria. For example, signal strength system 110 may include a power measuring circuit or system, a peak signal detector system or circuit, a root-mean-square signal detector or circuit, or other suitable signal strength systems that are operable to determine the average or instantaneous strength of the received signal.

Signal strength system 110 is also operable to compare the measured signal strength to predetermined signal strength values that may be empirically determined as corresponding to acceptable noise levels at which noise suppressing circuitry is not required. Signal strength system 110 is operable to output noise presence data to duty cycle system 108, such that duty cycle system 108 may use the data to determine whether to cycle components and systems of receiver 104 off and on.

System 100 also includes interference avoidance system 112, which is coupled to duty cycle system 108 and output 106. Interference avoidance system 112 may be implemented in hardware or a suitable combination of hardware and software and may comprise an application specific integrated circuit or a field programmable gate array. Interference avoidance system 112 is operable to track the output signal level at output 106 in response to the operation of duty cycle system 108. For example, when duty cycle system 108 activates, interference avoidance system 112 may store output levels over time of the response at output 106 to changes in the status of duty cycle system 108. Thus, when duty cycle system 108 initially activates, interference avoidance system 112 is operable to determine whether the magnitude of the signal at output 106 increases or decreases.

Duty cycle system 108 receives output 106 status data from interference avoidance system 112, and modifies either the cycling frequency or the on/off period times of the duty cycle in response to the output signal status data. For example, interference avoidance system 112 may transmit a signal to duty cycle system 108 to cause duty cycle system 108 to alter from a first preset duty cycle to a second preset duty cycle. Interference avoidance system 112 may then compare the signal output magnitude at output 106 from the first preset duty cycle to the second preset duty cycle to determine whether the signal magnitude has increased, decreased, or remained the same. If the signal magnitude has increased, this indicates that the duty cycle being used by duty cycle system 108 may correspond to the frequency of a noise signal being received by receiver 104, such that duty cycle system 108 is acting as an amplification system for the noise signal. In this situation, duty cycle system 108 will use the second preset duty cycle settings instead of the first preset duty cycle settings. Interference avoidance system 112 may also calculate new duty cycle criterion such as cycle time and on/off times, using an interference avoidance algorithm. This interference avoidance algorithm may test various sets of duty cycle criteria and corresponding output 106 magnitude values to determine an optimal selection of the duty cycle criteria for operation.

Signal strength system 110, duty cycle system 108, and interference avoidance system 112 may be implemented as a system 114 that includes coordinated portions of an application specific integrated circuit, a field programmable gate array, a programmable controller, or other suitable systems or components. System 114 may be a portion of a cellular telephone application specific integrated circuit, or may be included in a cellular telephone as a separate system or component. Likewise, system 114 may be included in other suitable components other than cellular telephones, such as cordless telephones, pagers, wireless data transmission devices, or other suitable systems or components.

In operation, system 100 is used to cycle noise reduction systems and components of receiver 104 such that the power requirements of receiver 104 are minimized as compared with a receiver 104 that is not cycled. System 100 is used to detect whether noise is present in a received broadcast signal at receiver 104. Noise sources vary as the function of time and location of receiver 104, and thus may not be present depending upon the location or time of operation of receiver 104.

System 100 first determines whether noise is present using signal strength measurement criteria. Depending upon the signal strength measurements, components and systems of receiver 104 may then be cycled using a duty cycle system 108. An interference avoidance system 112 is used to determine duty cycle frequency and on/off periods that do not amplify existing noise sources.

FIG. 2 is a diagram of a system 200 for receiving a signal in accordance with an exemplary embodiment of the present invention. System 200 may be a standard cellular telephone receiver circuit that includes additional systems and components for detecting the presence of noise, and for cycling noise suppression systems and components of system 200 off and on when noise is not present in the signal being received by a system 200.

System 200 includes low noise amplifier 202 which is coupled to antenna 102. Low noise amplifier 202 may be a cellular telephone low noise amplifier or other suitable low noise amplifiers. Low noise amplifier 202 is operable to receive a signal from an antenna and to amplify the signal while maintaining low noise levels in the amplified signal.

Low noise amplifier 202 is coupled to mixer 204. Mixer 204 may be a cellular telephone mixer, and is operable to shift the frequency of a received signal from a transmission frequency down to signal processing frequency or intermediate frequency. Mixer 204 is coupled to band pass filter 206.

Band pass filter 206 may be a cellular telephone handset band pass filter that is designed to pass a frequency band having a predetermined allowable frequency band. This frequency band may be determined from cellular transmission standards or specifications, and is typically dictated by industry standards. Band pass filter 206 is coupled to automatic gain control system 208.

Automatic gain control system 208 may be a cellular telephone automatic gain control system that is operable to receive a signal from band pass filter 206 and to amplify the signal to a predetermined gain or decibel signal strength level. Automatic gain control system 208 is operable to receive a signal at a variable signal strength and to output an amplified signal at a predetermined signal strength. Automatic gain control system 208 is coupled to mixer 210.

Mixer 210 is similar to mixer 204 and may be a cellular telephone mixer that is operable to convert the frequency of a signal from a first level to a second predetermined level. For example, mixer 210 may be used to down convert a signal from an intermediate signal level for use in a telecommunications system, such as a cellular telephone handset. Mixer 204 is coupled to buffered driver 212.

Buffered driver 212 may be a cellular telephone buffered driver and is configured to amplify the signal received from mixer 210 and to output the signal at output 106. Buffered driver 212 also prevents signal back feed from output 106, thus protecting the components of system 200.

System 200 also includes signal strength system 110, duty cycle system 108, and interference avoidance system 112. Signal strength system 110 is coupled to mixer 204 and to band pass filter 206, and receives the signal for testing of signal strength from mixer 204. In this configuration, the signal being tested by signal strength system 110 has already been amplified by a low noise amplifier 202 and has been frequency shifted by mixer 204. Thus, the signal received by signal strength system 110 is a full bandwidth signal, and has not, been passed through band pass filter 206. For this reason, signal strength system 110 may determine the signal strength of noise signals that fall far beyond the bandwidth of the data signal that is being amplified by system 200.

In this exemplary embodiment, signal strength system 110 is conservative in that it may detect signals that are not interfering with the operation of system 200, but may nonetheless indicate that noise suppression systems and components of system 200 should remain on full cycle regardless of the fact that they are not necessarily required. Duty cycle system 108 is coupled to mixer 204, signal strength 110, automatic gain control system 208, and interference avoidance system 112. Duty cycle system 108 receives control data from signal strength system 110 and controls the operation of mixer 204 and automatic gain control system 208 in response to this control data.

For example, signal strength system 110 may indicate one or more levels of noise, such that at an intermediate level, either one of mixer 204 or automatic gain control system 208 is cycled. The duty cycle system 108 may use predetermined duty cycle settings, or may be programmable such that the duty cycle frequencies and on/off times are controllable by signal strength system 110 and interference avoidance system 112.

Interference avoidance system 112 is coupled to output 106, and tracks the magnitude of the signal at output 106 in response to the operation of duty cycle system 108. For example, interference avoidance system 112 may determine whether the magnitude of the signal output 106 increases when duty cycle system 108 is activated, or whether such magnitude increases as duty cycle system 108 is cycled through preset duty cycle settings. In this manner, interference avoidance system 112 may be used to automatically hunt for a suitable duty cycle setting without being required to monitor the frequency and magnitude of noise levels received at antenna 102.

In operation, system 200 may be used with a cellular telephone handset to decrease power consumption requirements of the mixer 204 and automatic gain control system 208 of the cellular telephone handset. When it is determined that noise is not present on the signal being received by system 200, duty cycle system 108 cycles the mixer 204 and automatic gain control system 208 off and on at a predetermined acceptable rate, thus decreasing power consumption requirements of these components without adversely affecting the signal quality of output 106. Interference avoidance system 112 may be used to ensure that duty cycle system 108 does not cycle mixer 204 or automatic gain control system 208 off and on at a level that corresponds to a noise signal, which may result in amplification of the noise signal.

FIG. 3 is a frequency diagram 300 showing base band and noise frequencies that may be received by receiver 104 in accordance with an exemplary embodiment of the present invention. Signal strength system 110 may generate different outputs to duty cycle system 108 depending on the signal received, as shown by frequency diagram 300.

Frequency diagram 300 includes a spread spectrum signal in band 3 which may be an exemplary desired signal received by a receiver, such as receiver 104. The spread spectrum signal of band 3 includes six exemplary signal bands which may be decoded according to known code division multiple access decoding techniques. Other suitable data coding systems and signals may be likewise used.

Also included in frequency diagram 300 are noise signal 1 and noise signal 2. Noise signal 1 is within band 2, whereas noise signal 2 is within band 1 as shown in FIG. 3. Thus, the frequency band that encompasses noise signal 1 is narrower than the frequency band that encompasses noise 2. Noise signal 2 in band 3 does not interfere with the spread spectrum signal received in band 1, whereas noise signal 1 in band 2 may cause interference to the spread spectrum signal in band 1, because of its proximity to the spread spectrum signal.

In operation, the signal from a receiver that has components and systems being duty cycled would be unacceptable if noise signal 1 was being received, whereas the cycling of such components and systems would not result in an unacceptable signal if noise signal 2 was being received. Likewise, when the receiver is receiving a signal that includes only the spread spectrum signal of band 3, the stages of the receiver that are used to increase the signal-to-noise ratio are not required to produce an acceptable signal-to-noise ratio. These stages may be shut down or minimized for noise signal 2 or in the absence of a noise signal.

Alternatively, when a noise signal such as noise signal 1 or noise signal 2 is received, these stages may be allowed to operate, and may only be duty cycled in the absence of any noise signal. The present invention detects for the presence of noise signals such as noise signal 1 or noise signal 2, and duty cycles components and systems of the receiver in response to the presence of absence of such noise signals. Intermediate levels of duty cycling may be used for noise signals such as noise signal 2, or an average power method may be used to detect for the presence of noise such that duty cycling is either performed or not performed, without any intermediate levels of duty cycling.

Figure 4:
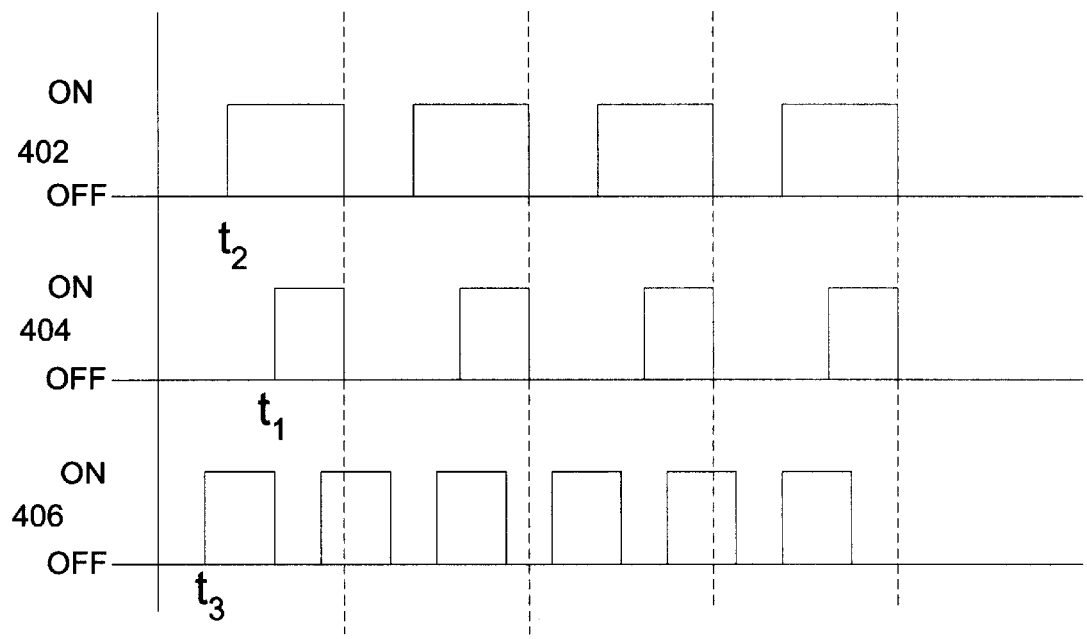
FIG. 4 is a diagram of duty cycles in accordance with an exemplary embodiment of the present invention.

FIG. 4 is a duty cycle diagram 400 of duty cycles in accordance with an exemplary embodiment of the present invention. The duty cycles of duty cycle diagram 400 may be used to cycle systems and components of a receiver when noise signals are not being received, in order to decrease the power requirements of the systems and components of the receiver.

Duty cycle diagram 400 includes duty cycle 402. Duty cycle 402 has two states: on and off. Duty cycle 402 as shown includes four cycles which initiate with an off state and which transition at "t1" to an on state. It should be noted that this duty cycle may be used to either switch a component, such as mixer 204 or automatic gain control system 208 of FIG. 2, off and on or may be used to switch them from an on state to a fixed state, such that the output remains fixed over the period of time that the duty cycle is in the off state. Thus, duty cycle 402 would result in a cycle frequency that is determined by the length of time for one cycle, and an "on" period that is proportional to the period of time that the duty cycle signal remains in the "on" state.

Duty cycle diagram 400 also includes duty cycle 404. Duty cycle 404 has the same frequency as duty cycle 402, but has a different transition time "t2" at which time the duty cycle turns on. Thus, duty cycle 404 has an "on" state percentage that is lower than duty cycle 402, but has the same cycling frequency. Thus, it would be expected that the power consumption of a component being cycled under duty cycle 404 would be less than the power consumption of a component being cycled under duty cycle 402, but that some frequency components of duty cycle 404 would be similar to frequency components of duty cycle 402.

It should be noted that various frequency components may be created by the transition time from an "off" state to an "on" state, such that frequency components may be amplified using duty cycle 402 that would not be amplified using duty cycle 404. Thus, it may be possible to mitigate amplified noise states by varying the time from "t1" to "t2" without changing the cycling frequency of the duty cycle, such as is shown in duty cycles 402 and 404.

Duty cycle 406 includes six cycles in the period of time shown for four cycles of duty cycles 402 and 404. Thus, duty cycle 406 has a frequency that is higher than duty cycle 404 or 402. Duty cycle 406 also has an "on" time "t3" that is proportionately equal to "on" time "t1" of duty cycle 402. Thus, duty cycles 402 and 406 have a similar "on" time percentage, even though the frequency of duty cycle 406 is higher than that of duty cycle 402. Thus, power consumption requirements of a component under duty cycle 406 would be expected to be similar to those of duty cycle 402. Such power requirements may be increased for duty cycle 402 due to losses that may be caused when a component remains in the off state for a period of time that exceeds an allowable period of time, as a result of hysteresis effects from electric or magnetic fields or other physical effects.

In operation, duty cycles 402, 404, and 406 may be used to adjust both the noise reduction capability of components of the receiver and also to adjust the power requirements of the components or systems of a receiver. For example, an interference avoidance system and duty cycle system may select duty cycle 402 for predetermined stages of a receiver, and may then compare the receiver output for duty cycle 402 against the receiver output for duty cycle 404 or duty cycle 406 to determine if the output of the receiver changes appreciably with the change from the first to the second duty cycle. If the output of the receiver does change, depending upon whether the output increases or decreases, it may be determined that a noise signal is inadvertently being amplified by use of a particular duty cycle. Thus, the duty cycle parameters that result in the lowest output may be selected. Other systems may be used to select a suitable duty cycle in accordance with an exemplary embodiment of the present invention.

FIG. 5 is a flowchart of a method for suppressing noise 500 in accordance with an exemplary embodiment of the present invention. Method 500 may be used to turn off noise suppression components or systems of a receiver when a noise signal is not being received.

Method 500 begins at 502 where a signal is received such as at a radio receiver. The method then proceeds to 504, where it is determined whether the signal contains a level of noise that would require noise suppression. It may also be determined whether the signal contains intermediate levels of noise that require intermediate levels of noise suppression at 504. If it is determined that the signal does contain noise, the method proceeds to 506 where noise suppression circuitry is operated. Otherwise, the method proceeds to 508.

At 508, if it is determined that the signal does not contain noise or does not contain a level of noise that requires full noise suppression operation, a duty cycle is selected for the noise suppression circuitry. For example, a duty cycle may be selected only when noise has decreased below a predetermined allowable level. Alternatively, there may be intermediate levels for noise suppression, such as levels based on the frequency of the noise, wherein duty cycling is chosen at one of two or more predetermined levels of noise. The method then proceeds to 510.

At 510 it is determined whether the selected duty cycle is amplifying the noise signal. For example, when the duty cycling is introduced, the output of the system may be monitored to determine whether the output has increased in response to the duty cycling. Likewise, the output may be measured to determine whether it has increased beyond a predetermined allowable level, as the duty cycling will have the effect of decreasing the efficiency of noise suppression and decreasing the signal-to-noise ratio of the signal output. If it is determined that the duty cycle is amplifying a noise signal, the method proceeds to 512 where the duty cycle is adjusted. For example, the duty cycle may be adjusted using predetermined duty cycles, an interference avoidance algorithm, or other suitable methods. The method then returns to 510. If it is determined at 510 that the duty cycle is not amplifying the noise signal, the method proceeds to 514 and terminates.

In operation, method 500 is used to cycle components or systems of a receiver off and on when such components and systems are not required to increase the signal-to-noise ratio of an amplified signal. Method 500 also may be used to adjust the duty cycling of these systems or components such that they do not inadvertently amplify a noise signal.

FIG. 6 is a flowchart of a method 600 for receiving a signal in accordance with an exemplary embodiment of the present invention. Method 600 may be used to reduce power requirements of noise suppression components and systems of a radio receiver in response to received signal power.

Method 600 begins at 602 where the signal power of a received signal is determined. For example, the received signal may be amplified and the frequency shifted prior to determining the signal power. The method then proceeds to 604 where it is determined whether the signal power is above or below a predetermined level. For example, the level of noise that may be tolerated on a system before noise suppression is required may be empirically determined or calculated. For a spread spectrum signal, for example, the signal power of the signal in the absence of noise may fall within a known range. Thus, when the signal exceeds this level, it may indicate the existence of noise requiring noise reduction. If it is determined at 604 that signal power has exceeded the predetermined level, the method proceeds to 606.

At 606, a noise register is set. For example, this register may store a first value if noise is determined to be present in a signal, and may store a second value if it is determined that noise is not present. The method then proceeds to 608 where a duty cycle circuit checks the noise register. The duty cycle circuit may have a timing circuit that causes the duty cycle circuit to check on a periodic basis whether the noise register contains predetermined data. The method then proceeds to 610 where the duty cycle circuit sets the components and systems of the receiver to a full "on" state, such that the components and systems are removing the maximum amount of noise and are providing the required signal-to-noise ratio.

If it is determined at 604 that signal power is not at a predetermined level, the method proceeds to 612 where the noise register is cleared. The method then proceeds to 614 where the duty cycle circuit checks the noise register. At 616, the duty cycle circuit is set to a predetermined level. For example, if the value in the noise register corresponds to a predetermined value, then the duty cycle of the duty cycle circuit may begin at a first predetermined level and frequency based upon empirical data or other suitable data. The method then proceeds to 618 where the value of the output magnitude is stored. The method then proceeds to 620 where the duty cycle is modified, such as by changing the frequency or on/off times by a predetermined amount or in response to a noise avoidance algorithm. The method then proceeds to 622.

At 622, it is determined whether the new output magnitude is greater than the output magnitude that has been stored. For example, the output may be compared within a predetermined allowable range such that allowable statistical variations are discounted. If it is determined that the new output magnitude is less than the stored output magnitude, this indicates that the output magnitude has decreased from the initial duty cycle, and the method proceeds to 624. At 624, the new output magnitude is stored and the method returns to 620.

If it is determined at 622 that new output magnitude is not less than the stored output magnitude, this indicates that the output magnitude may fall within an allowable range. The method then proceeds to 626 where it is determined whether the new output is greater than the stored output magnitude. For example, the output may be compared within a predetermined allowable buffer range such that allowable statistical variations are discounted. If it is determined that the new output is greater than the stored output magnitude, the method proceeds to 628 and the original duty cycle is used, as this indicates that the duty cycle has left an area of stability and is approaching an area where a noise signal may be amplified. If it is determined at 626 that the new output is not greater than the stored output magnitude, then the method proceeds to 630 and the original or modified duty cycle may be used.

In operation, method 600 is used to determine whether to cycle systems and components of a receiver off and on, so as to conserve power when noise is not present that these systems and components would be required to suppress. When the noise is present, the systems and components are allowed to operate at full power, thus providing maximum noise suppression. When noise is not present, a duty cycle is used to decrease the power required by such systems and components without completely removing the operability of the systems or components.

In addition, method 600 determines whether the cycling of the systems or components is inadvertently amplifying an unwanted signal. If it is determined that such duty cycling is inadvertently amplifying an unwanted signal, the duty cycle is adjusted until the duty cycle does not amplify the unwanted signal.

Although preferred and exemplary embodiments of a system and method for receiving a signal have been described in detail herein, those skilled in the art will also recognize that various substitutions and modifications may be made to the systems and methods without departing from the scope and spirit of the appended claims.

What is claimed is:

1. A system for receiving a signal comprising:
   a receiver operable to receive the signal;
   a duty cycle system coupled to the receiver, the duty cycle system operable to turn the receiver off and on at a controllable frequency;
   an interference avoidance system coupled to the duty cycle system and a signal output, wherein the interference avoidance system generates status data that causes the duty cycle system to change from a first preset duty cycle to a second preset duty cycle and provides the status data to the duty cycle system; and
   a signal strength system coupled to the receiver and the duty cycle system, the signal strength system operable to determine the signal strength of the signal received by the receiver, to generate control commands based upon the signal strength, and to transmit the control commands to the duty cycle system.

2. The system of claim 1 wherein the receiver further comprises a plurality of stages, and the duty cycle system is coupled to one or more of the plurality of stages.

3. The system of claim 1 wherein the receiver further comprises a plurality of stages, the duty cycle system is coupled to two or more of the plurality of stages, and the duty cycle system is operable to turn each of the two or more of the plurality of stages off and on at a separately-controllable frequency.

4. The system of claim 1 wherein the receiver further comprises:
   a mixer stage operable to change the frequency of the signal;
   a band pass stage coupled to the mixer stage, the band pass stage operable to filter the signal;
   an automatic gain control stage coupled to the band pass stage, the automatic gain control stage operable to control the gain of amplification of the signal; and
   wherein the duty cycle system is coupled to the mixer stage and the automatic gain control stage, the duty cycle system is operable to turn the mixer stage on and off at a first frequency, and to turn the automatic gain control stage on and off at a second frequency.

5. The system of claim 1 wherein the receiver further comprises a mixer stage operable to change the frequency of the signal, and wherein the duty cycle system is coupled to the mixer stage and is operable to turn the mixer stage on and off.

6. The system of claim 1 wherein the receiver further comprises an automatic gain control stage operable to control the gain of amplification of the signal, and wherein the duty cycle system is coupled to the automatic gain control stage and is operable to turn the automatic gain control stage on and off.

7. The system of claim 1 wherein the signal strength system comprises a signal power meter.

8. The system of clam 1 wherein the interference avoidance system is operable to determine whether the magnitude of the signal output changes for a corresponding change in a duty cycle of the duty cycle system.

9. The system of claim 1 wherein the interference avoidance system is operable to receive duty cycle data from the duty cycle system and to select a duty cycle for the duty cycle system based upon the signal output.

10. The system of claim 1 wherein the receiver further comprises:
    a mixer stage operable to change the frequency of the signal;
    a band pass stage operable to filter the signal; and
    wherein the signal strength system is coupled to the mixer stage and the band pass stage.

11. A system for receiving a signal comprising:
    a low noise amplifier operable to receive the signal and to amplify the signal;
    a mixer coupled to the low noise amplifier, the mixer operable to receive the amplified signal and to shift the frequency of the signal;
    a band pass filter coupled to the mixer, the band pass filter operable to receive the frequency-shifted signal and to pass a predetermined band of the signal;
    an automatic gain control system coupled to the band pass filter, the automatic gain control system operable to amplify the signal received from the band pass filter to a predetermined amplitude;
    a duty cycle system coupled to the mixer, the duty cycle system operable to turn the mixer off and on at a controllable frequency;
    an interference avoidance system coupled to the duty cycle system and a signal output, wherein the interference avoidance system generates status data that causes the duty cycle system to change from a first preset duty cycle to a second preset duty cycle and provides the status data to the duty cycle system; and
    a signal strength system coupled to the mixer, the band pass filter, and the duty cycle system, the signal strength system operable to determine the signal strength of the signal received by the receiver, to generate control commands based upon the signal strength, and to transmit the control commands to the duty cycle system.

12. The system of claim 11 wherein the duty cycle system is coupled to the automatic gain control system and is operable to cycle the automatic gain control system off and on at a controllable frequency.

13. The system of claim 11 wherein the signal strength system comprises a signal power meter.

14. The system of claim 11 wherein the interference avoidance system is operable to determine whether the magnitude of the signal output changes for a corresponding change in the duty cycle.

15. A method for processing a signal comprising:
    determining whether a received signal includes a noise signal by determining whether a magnitude of the signal changes for a corresponding change in a duty cycle of a duty cycle system;
    generating status data with an interference avoidance system if the magnitude of the signal changes for a corresponding change in a duty cycle of a duty cycle system;
    generating a signal strength of the received signal by a signal strength system;
    generating control data based upon the signal strength;
    transferring the control data to the duty cycle system;
    allowing noise suppression circuitry to operate if the status data indicates that the received signal includes the noise signal; and
    turning the noise suppression circuitry off if the status data indicates that the received signal does not include the noise signal.

16. The method of claim 15 wherein allowing noise suppression circuitry to operate if the received signal includes the noise signal comprises allowing a mixer and an automatic gain control system of a receiver to remain on continuously.

17. The method of claim 15 wherein determining whether the received signal includes the noise signal comprises:
    determining the signal power;
    indicating that noise is present if the signal power is greater than a predetermined level; and
    indicating that noise is not present if the signal power is less than a predetermined level.

18. The method of claim 15 wherein allowing noise suppression circuitry to operate if the received signal includes the noise signal comprises:
    receiving noise presence data; and
    setting the duty cycle of the duty cycle system to be continuously on if the noise presence data has a predetermined value.

19. The method of claim 15 wherein turning the noise suppression circuitry off if the received signal does not include the noise signal comprises:
    receiving noise presence data;
    setting a cycle time of the duty cycle system to a predetermined value; and
    setting the duty cycle of the duty cycle system such that the duty cycle system turns off power to one or more components for a predetermined fraction of each duty cycle.

20. The method of claim 15 further comprising adjusting the rate at which the noise suppression circuitry is turned off so as to reduce noise amplification.

* * * * *